United States Patent
Buchanan et al.

(10) Patent No.: US 10,019,081 B2
(45) Date of Patent: Jul. 10, 2018

(54) FUNCTIONALITY SWITCHING IN POINTER INPUT DEVICES

(75) Inventors: Dohn Robert Buchanan, Mesa, AZ (US); Robert Charles Jackson, Sahuarita, AZ (US); Jason Matthew Robaina, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1544 days.

(21) Appl. No.: 12/354,737

(22) Filed: Jan. 15, 2009

(65) Prior Publication Data

US 2010/0180237 A1  Jul. 15, 2010

(51) Int. Cl.
*G06F 3/038* (2013.01)
*G06F 3/0354* (2013.01)
*G06F 3/01* (2006.01)

(52) U.S. Cl.
CPC .............. *G06F 3/038* (2013.01); *G06F 3/017* (2013.01); *G06F 3/03543* (2013.01)

(58) Field of Classification Search
CPC ...... G06F 3/017; G06F 3/033; G06F 3/04812; G06F 3/04842; G06F 3/038; G06F 3/03543
USPC ................. 715/757, 775, 852, 863
See application file for complete search history.

(56) References Cited

U.S. PATENT DOCUMENTS

| | | | | |
|---|---|---|---|---|
| 5,091,866 A | * | 2/1992 | Takagi | G06F 3/0481 715/803 |
| 5,252,951 A | * | 10/1993 | Tannenbaum et al. | 715/863 |
| 5,374,942 A | * | 12/1994 | Gilligan et al. | 345/157 |
| 5,473,343 A | * | 12/1995 | Kimmich | G06F 3/04812 715/860 |
| 5,617,114 A | * | 4/1997 | Bier | G06F 3/0481 345/634 |
| 5,745,719 A | * | 4/1998 | Falcon | G06F 3/04883 715/856 |
| 6,084,598 A | * | 7/2000 | Chekerylla | G06T 11/60 345/427 |
| 6,111,580 A | * | 8/2000 | Kazama | G06F 3/011 340/575 |

(Continued)

FOREIGN PATENT DOCUMENTS

CN       1790262    *  6/2006  ............... G06F 9/44
WO   2009/088808 A2    7/2009

OTHER PUBLICATIONS

StrokeIt—Mouse Gestures for Windows. As available Sep. 8, 2008. Assorted pages retrieved via Internet Archive from <http://tcbmi.com/strokeit> on <Jun. 14, 2015>. 25 pages.*

(Continued)

*Primary Examiner* — Amy M Levy
(74) *Attorney, Agent, or Firm* — Griffiths & Seaton PLLC

(57) ABSTRACT

Various embodiments for switching functionality of a graphical user interface (GUI) pointer input device are provided. A first gesture pattern is configured. The first gesture pattern, when performed, enables a predetermined function of the input device. The predetermined function substitutes for a default function of the input device. The enabling of the predetermined function is indicated to a user on the GUI. A second gesture pattern is configured. The second gesture pattern, when performed, cancels the predetermined function of the input device and enables the default function.

9 Claims, 4 Drawing Sheets

(56) References Cited

U.S. PATENT DOCUMENTS

| | | | |
|---|---|---|---|
| 6,219,034 B1* | 4/2001 | Elbing | G06F 3/016 345/158 |
| 6,336,149 B1* | 1/2002 | Preston | G06F 3/023 710/1 |
| 6,380,924 B1* | 4/2002 | Yee | G06F 3/023 235/146 |
| 6,469,722 B1 | 10/2002 | Kinoe et al. | |
| 6,623,194 B1* | 9/2003 | Lip | G06F 1/1616 345/157 |
| 6,847,348 B2* | 1/2005 | Rojewski | G06F 3/04883 345/156 |
| 6,907,581 B2* | 6/2005 | Noy | G06F 3/0481 715/856 |
| 7,098,896 B2* | 8/2006 | Kushler et al. | 715/863 |
| 7,111,254 B1* | 9/2006 | Rosen | G06F 3/04812 715/760 |
| 2002/0015054 A1* | 2/2002 | Hibino | G06F 3/0481 345/677 |
| 2002/0070969 A1 | 6/2002 | Barksdale et al. | |
| 2003/0023952 A1* | 1/2003 | Harmon, Jr. | G06F 9/45512 717/106 |
| 2003/0191559 A1* | 10/2003 | Chatsinchai | G06F 9/4443 700/245 |
| 2004/0021663 A1* | 2/2004 | Suzuki | G06F 3/016 345/419 |
| 2004/0140954 A1* | 7/2004 | Faeth | G06F 3/03543 345/163 |
| 2004/0193413 A1* | 9/2004 | Wilson et al. | 704/243 |
| 2004/0227741 A1* | 11/2004 | Koda | G06F 3/017 345/183 |
| 2004/0261026 A1* | 12/2004 | Corson | G06F 9/45512 715/704 |
| 2005/0088410 A1* | 4/2005 | Chaudhri | G06F 3/04812 345/157 |
| 2005/0088420 A1* | 4/2005 | Dodge et al. | 345/173 |
| 2005/0093817 A1* | 5/2005 | Pagan | G06F 3/016 345/156 |
| 2005/0204295 A1* | 9/2005 | Voorhees | G06F 3/0481 715/747 |
| 2005/0243065 A1* | 11/2005 | Raynor | 345/163 |
| 2006/0005132 A1* | 1/2006 | Herdeg, III | G06F 9/45512 715/704 |
| 2006/0012580 A1 | 1/2006 | Perski et al. | |
| 2006/0036971 A1* | 2/2006 | Mendel | G06F 9/4443 715/856 |
| 2006/0095867 A1* | 5/2006 | Rogalski | G06F 3/0481 715/858 |
| 2006/0132460 A1* | 6/2006 | Kolmykov-Zotov | G06F 3/04812 345/173 |
| 2006/0143571 A1* | 6/2006 | Chan | G06F 3/03543 715/764 |
| 2006/0267966 A1 | 11/2006 | Grossman et al. | |
| 2007/0242056 A1* | 10/2007 | Engelhardt | G06F 3/0416 345/173 |
| 2008/0036743 A1* | 2/2008 | Westerman et al. | 345/173 |
| 2008/0052643 A1 | 2/2008 | Ike et al. | |
| 2008/0074391 A1* | 3/2008 | Coe | G06F 3/017 345/163 |
| 2008/0168403 A1* | 7/2008 | Westerman et al. | 715/863 |
| 2008/0252491 A1 | 10/2008 | De Ruyter et al. | |
| 2008/0256477 A1* | 10/2008 | Cho | G06F 3/04812 715/772 |
| 2009/0189858 A1 | 7/2009 | Lev et al. | |
| 2010/0199191 A1* | 8/2010 | Takahashi | G06Q 10/10 715/741 |
| 2011/0084904 A1* | 4/2011 | Tan | G06F 3/0238 345/163 |
| 2012/0188250 A1 | 7/2012 | Kaplan et al. | |

OTHER PUBLICATIONS

Guiagoussou et al., ACM Digital Library: "Implementation of a Diagnostic and Troubleshooting Multi-agent System for Cellular Networks," International Journal of Network Management Int. J. Network Mgmt. 9, 221-237 (1999).

International Search Report dated Dec. 6, 2010 for counterpart International Application No. PCT/EP2009/067334.

* cited by examiner

FUNCTIONALITY SWITCHING IN POINTER INPUT DEVICES

BACKGROUND OF THE INVENTION

Field of the Invention

The present invention relates in general to computers, and more particularly to a method, system, and computer program product switching functionality in a graphical user interface (GUI) pointer input device.

Description of the Related Art

The majority of businesses in the world today use computers and computer systems to store and manage information. In the context of computers and computer systems, an input device is any peripheral used to provide data and control signals to the computer system. Input and output devices make up the hardware interface between the computer and a user or external world.

In general, any sensor that monitors, scans for and accepts information from the external world may be considered an input device, whether or not the information is under the direct control of a user. Common examples of input devices include the conventional keyboard and mouse. A mouse is an example of a pointer input device, which includes a broad variety of input devices such as various types of mice, trackballs, trackpads, touchpads, and the like. Input devices such as pointer devices allow for user interaction with a graphical user interface (GUI) of the computer system. In this way, the pointer devices are examples of human interface devices, as the devices provide an interface between user and computer.

Typically, a pointer input device includes at least one button, button or "tap" functionality, or is in close proximity to the button or tap functionality. This functionality is commonly used to perform default functions of the pointer input device. For example, a user may select a portion of text by positioning the cursor at a specific location and holding a button/tapping and holding while physically moving the input device or moving the user's hand across the device. Some devices include additional buttons that perform additional default functionality, such as opening a menu.

SUMMARY OF THE INVENTION

While pointer input devices are useful for performing some functions, the total number of functions available to be performed by the devices is limited. For example, the default functions performed by mice are generally consistent, with the left mouse button used to select text, a right mouse button used to open and select one of a predefined menu of functions, and the middle mouse button used for scrolling functionality. However, in many cases, users may need to perform additional functionality. Typically, such additional functionality is performed by a series of steps (such as a keyboard shortcut used to change a text selection to italics). The steps may not be performed using the pointer input device, and may cause the user to expend additional time, which may negatively impact productivity.

In light of the foregoing, a need exists for a mechanism that expands the availability of functionality for a pointer input device, enlarging the usability of the pointer input device by providing additional levels of programmable functionality. Accordingly, in one embodiment, by way of example only, a method for switching functionality of a graphical user interface (GUI) pointer input device is provided. A first gesture pattern is configured. The first gesture pattern, when performed, enables a predetermined function of the input device. The predetermined function substitutes for a default function of the input device. The enabling of the predetermined function is indicated to a user on the GUI. A second gesture pattern is configured. The second gesture pattern, when performed, cancels the predetermined function of the input device and enables the default function.

In an additional embodiment, again by way of example only, a system for switching functionality of a graphical user interface (GUI) pointer input device is provided. A function mode module is in communication with a processor device. The function mode module is adapted for configuring a first gesture pattern. The first gesture pattern, when performed, enables a predetermined function of the pointer input device. The predetermined function substitutes for a default function of the pointer input device. The function mode module is further adapted for indicating enabling of the predetermined function to a user on the GUI, and configuring a second gesture pattern. The second gesture pattern, when performed, cancels the predetermined function of the pointer input device and enables the default function.

In an additional embodiment, again by way of example only, a computer program product for switching functionality of a graphical user interface (GUI) pointer input device is provided. The computer program product comprises a computer-readable storage medium having computer-readable program code portions stored therein. The computer-readable program code portions comprise a first executable portion for configuring a first gesture pattern, wherein the first gesture pattern, when performed, enables a predetermined function of the pointer input device, the predetermined function substituting for a default function of the pointer input device, a second executable portion for indicating enabling of the predetermined function to a user on the GUI, and a third executable portion for configuring a second gesture pattern, wherein the second gesture pattern, when performed, cancels the predetermined function of the pointer input device and enables the default function.

In still an additional embodiment, again by way of example only, a method for configuring switching from a first default function of a graphical user interface (GUI) pointer input device to a second predetermined function in a computing environment is provided. At least one action of the GUI pointer input device as performed by a user is recorded. The at least one action is stored as the second predetermined function. Upon a detection of a performance by a first gesture pattern by the user, the second predetermined is activated. The second predetermined function substitutes for the first default function.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present description and claimed subject matter describe exemplary system, method, and computer program product embodiments for switching functionality of a pointer input device in a computing environment from default functionality to additional functionality specified by a user. The illustrated embodiments implement "gesture patterns" that, when performed by a user, enable and disable the additional functionality. The gesture patterns may vary depending on a particular implementation, as will be described. The additional functionality of the pointer input device is programmable by the user and may vary according to particular implementations.

In one embodiment, a user may leverage a tool to record the additional functionality. For example, the additional functionality may consist of a series of steps normally taken by the user in conjunction with other input devices, such as a keyboard device. Once the additional functionality is recorded and enabled, it may be stored and performed in a single pointer input device action (such as a mouse left click action), thus saving the user time and increasing productivity.

Figure 1:
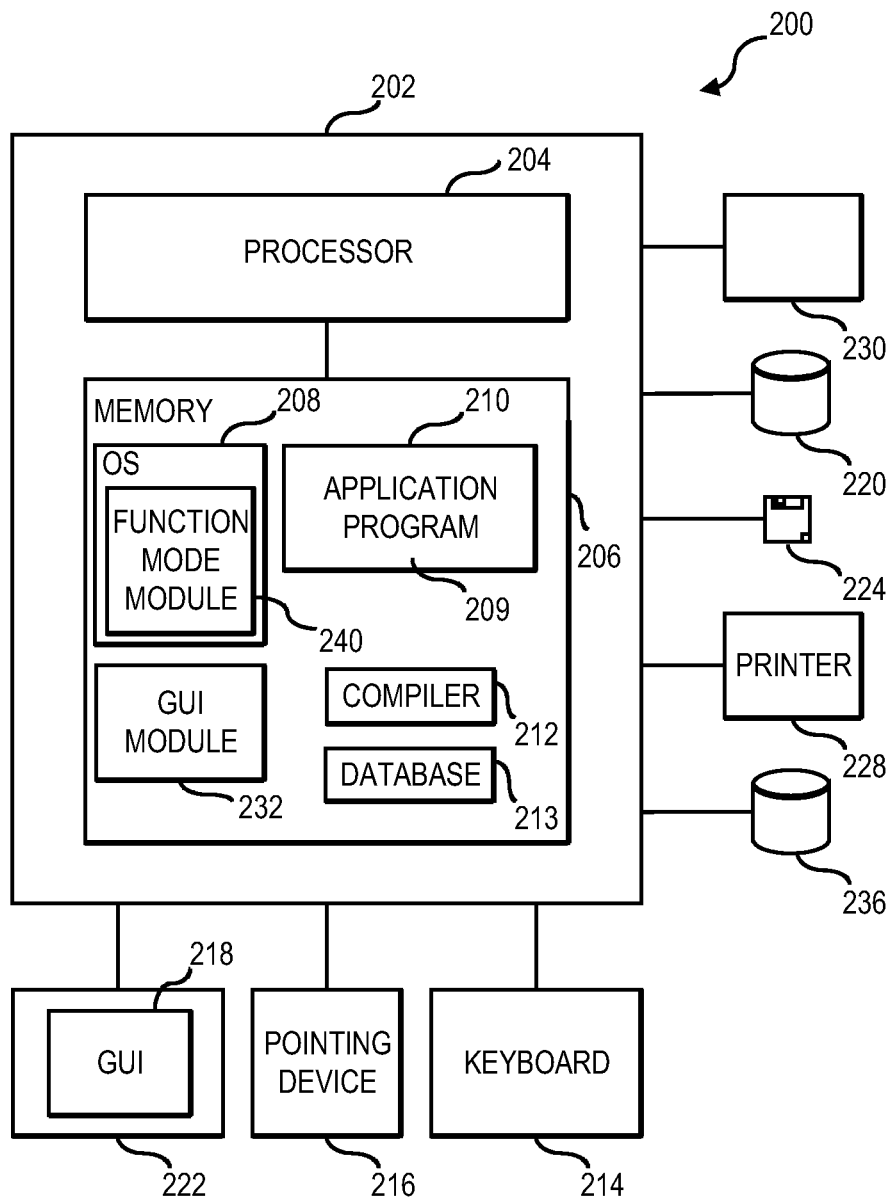
FIG. 1 is an exemplary computing environment in which aspects of the present invention may be implemented.

FIG. 1 hereafter provides an example of computer environment in which the mechanisms of the following embodiments may be implemented. It should be appreciated, however, that FIG. 1 is only exemplary and is not intended to state or imply any limitation as to the particular architectures in which the exemplary aspects of the various embodiments may be implemented. Many modifications to the architecture depicted in FIG. 1 may be made without departing from the scope and spirit of the following description and claimed subject matter.

FIG. 1 illustrates an exemplary computer environment 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a pointer input device 216, a printer 228, etc. Of course, those skilled in the art will recognize that any combination of the above components, or any number of different components, peripherals, and other devices, may be used with the computer 202.

Pointer input device 216 may include a variety of devices, such as a variety of mice (optical, wireless, laser, inertial, etc.), touchpads, trackballs, and the like. The pointer input device 216 may include or may be associated with one or more buttons. In addition (or alternatively), the pointer input device 216 may allow a user to physically tap to provide button-like functionality. In some embodiments, a portion of a touchpad, or an entire surface area of a touchpad may be itself depressed to provide button-like functionality. As the skilled artisan will appreciate, a number of pointer input devices may be used and are contemplated.

Generally, the computer 202 operates under control of an operating system (OS) 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. In one embodiment of the present invention, the OS 208 facilitates the backup mechanisms. Although the GUI module 232 is depicted as a separate module, the instructions performing the GUI functions can be resident or distributed in the operating system 208, the computer program 210, or implemented with special purpose memory and processors. The computer 202 also implements a compiler 212 that allows an application program 210 written in a programming language such as COBOL, PL/1, C, C++, JAVA, ADA, BASIC, VISUAL BASIC or any other programming language to be translated into code that is readable by the processor 204.

After completion, the computer program 210 accesses and manipulates data stored in the memory 206 of the computer 202 using the relationships and logic that was generated using the compiler 212. A pointer input device action database 213 is associated with the application program 210. The functionality of the database 213 will be further described, following. Database 213 may be alternatively integrated into function mode module 240 or elsewhere. The computer 202 also optionally comprises an external data communication device 230 such as a modem, satellite link, Ethernet card, wireless link or other device for communicating with other computers, e.g. via the Internet or other network.

Data storage device 220 is a direct access storage device (DASD) 220, including one or more primary volumes holding a number of datasets. DASD 220 may include a number of storage media, such as hard disk drives (HDDs), tapes, and the like. Data storage device 236 may also include a number of storage media in similar fashion to device 220. The device 236 may be designated as a backup device 236 for holding backup versions of the number of datasets primarily stored on the device 220. As the skilled artisan will appreciate, devices 220 and 236 need not be located on the same machine. Devices 220 may be located in geographically different regions, and connected by a network link such as Ethernet. Devices 220 and 236 may include one or more volumes, with a corresponding volume table of contents (VTOC) for each volume.

In one embodiment, instructions implementing the operating system 208, the computer program 210, and the compiler 212 are tangibly embodied in a computer-readable medium, e.g., data storage device 220, which may include one or more fixed or removable data storage devices, such as a zip drive, disc 224, hard drive, DVD/CD-ROM, digital tape, etc., which are generically represented as the disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention may include one or more associated software application programs 210 that include, for example, functions for recording user action(s) that are saved as one or more steps as additional functionality of the pointer input device 216. The program 210 may operate within a single computer 202 or as part of a distributed computer system comprising a network of computing devices. The network may encompass one or more computers connected via a local area network and/or Internet connection (which may be public or secure, e.g. through a VPN connection), or via a fibre channel Storage Area Network or other known network types as will be understood by those skilled in the art.

Operating system 208 includes a function mode module 240. The function mode module may operate in conjunction with application program(s) 210, and other components within the computer environment 200, to implement special, additional functionality of the pointer input device 216 in the environment 200. In one embodiment, the function mode module 240 is adapted to perform various methodologies that will be further described, such as recording one or more action(s) of a user to be recalled collectively as the additional functionality, as will be further described. As one skilled in the art will appreciate, however, various additional components of the environment 200 may work individually or in concert to define, initialize, and perform the additional, user-specified functionality as will be further described.

In general, and in accordance with the present invention, a strategic order of clicks/movements from the pointer input device may be collectively defined as an enabling gesture pattern. Subsequent performance of the enabling gesture pattern as defined then enables the additional pointer input device functionality. A visual confirmation mechanism is then employed to indicate to the user that the additional functionality has been enabled. Such a mechanism may include the display of a unique form, display of a unique color, and display of a unique identification of a cursor (blinking pointer arrow, for instance). Similarly, the mechanism may include such displays of visual cues associated with the cursor.

In some embodiments, more than one gesture pattern may be used to enable multiple levels of functionality. For example, one enabling gesture pattern may be used to enable a first level of functionality. The first level functionality may be indicated to the user. The user may then perform an additional gesture pattern to enable a second level of functionality, and so on. In this way, multiple levels of available functionality may be provided to a user simply upon the performance of one or more gesture patterns.

When the user has completed a task using the additional functionality, the user may then perform a disabling gesture pattern to disable the additional functionality and enable default functionality of the pointer input device. In cases of multiple levels of functionality, a particular gesture pattern may return the user to a lower level of functionality, while an additional particular gesture pattern may disable all additional functionality and return the functionality of the pointer input device to a default setting.

Figure 2:
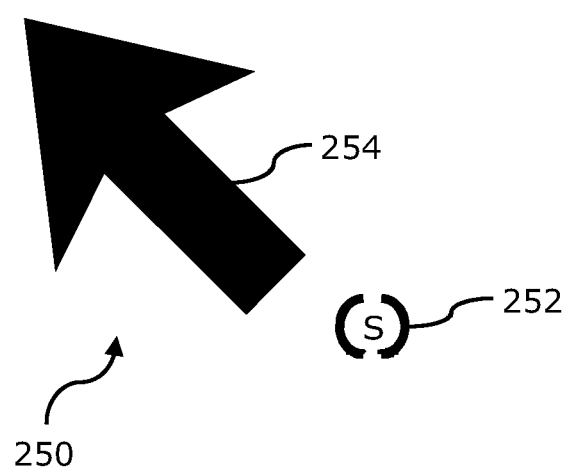
FIG. 2 is an exemplary indicator of an enabling of additional functionality of a pointer input device on a graphical user interface (GUI)

Turning to FIG. 2, an exemplary GUI indicator 250 of enabled additional functionality of a pointer input device is shown. Indicator 250 includes an arrow pointer 254 accompanied by an insignia 252. As discussed previously, a variety of indicator mechanisms may be employed to notify the user that additional functionality has been enabled, such as various colors, forms, and related unique identification either of, or associated with, the arrow pointer 254. In the depicted embodiment, arrow pointer 254 may turn a solid color (e.g., red) when enabled. The arrow pointer 254 may blink an alternating pattern of colors (e.g., red/white, red/black). In the depicted embodiment, symbol "(S)" 252 accompanies the arrow pointer 254 to provide notification of special functionality. The symbol 252 is removed once the additional functionality is disabled.

The additional functionality varies according to the user's recorded preferences, again as previously described. For example, the user may record one or more actions, or steps that are saved as the additional functionality. For example, the user may wish to change a font, change a text color, indent text, perform a word count of a paragraph, insert a symbol or a special character, and the like. The user may wish to perform other kinds of functionality, such as using the pointer input device to close a window with a single click or tap, for example. The skilled artisan will appreciate that the variety of additional functionality is essentially unlimited in availability. In one embodiment, to record such additional functionality, the function mode module 240 (FIG. 1) may use an application program 210 (FIG. 1) that may be adapted to function as an input device utility. The utility may present a configuration GUI screen to the user that allows the user to select predetermined functionality and/or record functionality. Here again, the skilled artisan will appreciate that a variety of mechanisms may be used to capture the user's preferences and record desired functionality.

A variety of gesture patterns (whether disabling or enabling) may be pre-configured (or determined by the user). In one embodiment, the enabling gesture pattern may include the user pointing the pointer 254 on a portion of the GUI that a single-click does not have a specified action. The user may then click or tap twice, holding the second click/tap for a period of time (e.g., three seconds). After the elapse of time, the additional functionality is indicated, such as the indicator 250 depicts.

To cancel the additional functionality, the user may perform a disabling gesture pattern such as tapping/clicking twice while holding on the second click/tap for an additional period of time (e.g., two seconds). The indicator 250 would then return to a default setting. For example, in the depicted embodiment, the symbol 252 disappears and the color of pointer 254 returns to black.

Figure 3:
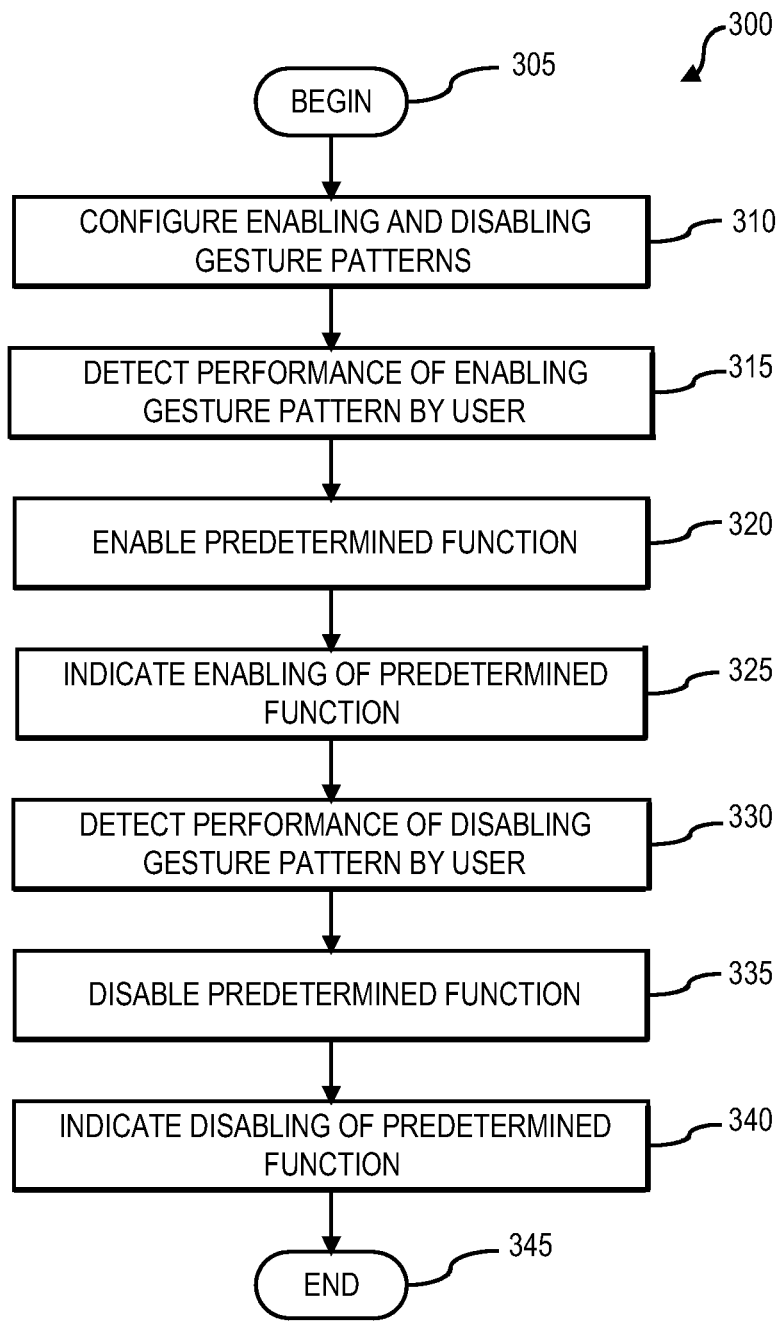
FIG. 3 is an exemplary method for switching functionality of a pointer input device.
Figure 4:
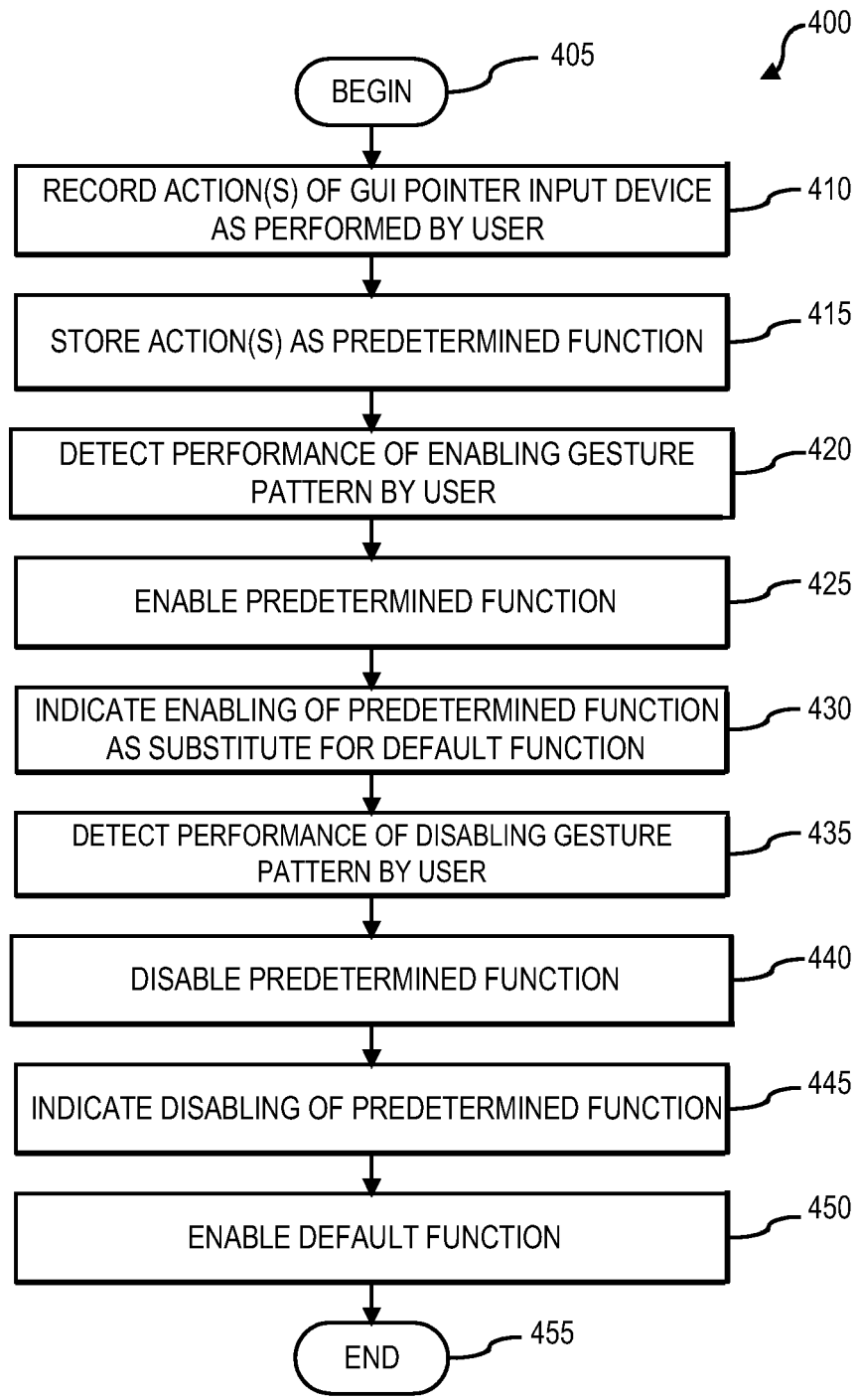
FIG. 4 is an exemplary method for configuring switching functionality of a pointer input device.

FIGS. 3 and 4, following illustrate exemplary methods for switching functionality of a pointer input device/configuring switching of functionality of a pointer input device in a computing environment. As one skilled in the art will appreciate, the described methods may be implemented by various means, such as hardware, software, firmware, or a combination thereof operational on or otherwise associated with the computing environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Turning to FIG. 3, an exemplary method 300 for switching functionality of a pointer input device in a computing environment is depicted. Method 300 begins (step 302) with the configuration (either by a user, administrator, or programmer) of enabling and disabling pointer input device gesture patterns (step 310). For example, the user may select the gesture patterns using a utility application, or the gesture patterns may be predefined. Once the gesture patterns are configured, the computing environment operates normally until the detection of a performance of one or more enabling gesture patterns as performed by the user (step 315).

Once an enabling gesture pattern is detected (such as the depression of a button on the pointer input device for a predetermined time), predetermined additional functionality is enabled (step 320) and indicated to the user (step 325). The predetermined additional functionality substitutes for the default functionality of the pointer input device. The indicator may include the display of a unique form, a unique color, and a unique identification of the cursor or visual cues associated with the cursor. For example, the indicator may include a flashing cursor, flashing color, and/or display of a symbol as previously described.

The user continues to use the input pointer device according to the enabled functionality until one or more disabling gesture patterns are detected (step 330). When this occurs, the additional functionality is disabled (step 335) and the indicator is disabled (step 340). The method 300 then ends (step 345).

Turning to FIG. 4, an exemplary method 400 for configuring switching functionality of a pointer input device in a computing environment is depicted. Method 400 begins (405) with the recording of one or more actions of, or associated with, the GUI pointer input device as configured/performed by a user (step 410). Here again, the user may select the functionality using a utility, or may record the action(s) herself. The action(s) is stored as the additional predetermined function of the pointer input device (step 415).

Operation of the computing environment continues until the detection of a performance of an enabling gesture pattern as performed by a user (step 420). When the enabling gesture pattern is detected, the predetermined function is enabled (step 425), and indicated to the user (step 430). The predetermined function substitutes for the default function.

Operation of the predetermined function continues until the computing environment detects the performance of a disabling gesture pattern as performed by the user (step 435). At this point, the predetermined function is disabled (step 440), and the indicator is removed (step 445). The computing environment returns to implementing default functionality associated with the pointer input device (step 450). Method 400 then ends (step 455).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for switching functionality of a graphical user interface (GUI) pointer input device, comprising:
configuring a first gesture pattern of a first strategic order of clicks and movements using the pointer input device, the pointer input device comprising a computer mouse, wherein the first gesture pattern, when performed, enables a first predetermined function of the pointer input device, the first predetermined function having been previously recorded as a series of steps normally taken by a user in conjunction with a keyboard device and thereby substituting for a default function of the pointer input device;
detecting performance of the first gesture pattern and indicating enabling of the first predetermined function to the user on the GUI, wherein indicating enabling of the first predetermined function to the user on the GUI includes enabling a first enablement indication comprising a flashing cursor and enabling a flashing color associated with the cursor;
subsequent to detecting the performance of the first gesture pattern and indicating the enablement of the first predetermined function using the first enablement indication, detecting performance of a second gesture pattern of a second strategic order of clicks and movements using the pointer input device, the second gesture pattern configured at a time commensurate with the configuration of the first gesture pattern; wherein the second gesture pattern, when performed, enables a second predetermined function coexistent with the first predetermined function such that the second predetermined function is enabled on top of the first predetermined function; and wherein the second predetermined function is indicated as enabled to the user on the GUI using a second enablement indication;
prior to detecting the performance of the first gesture pattern, configuring a third gesture pattern, wherein the third gesture pattern, when performed, cancels the first and second predetermined function of the pointer input device and enables the default function of the pointer input device; and
detecting performance of the third gesture pattern and enabling the default function.

2. The method of claim 1, wherein configuring the first gesture pattern includes registering depressing a button on the pointer input device for a predetermined time to enable the first predetermined function of the pointer input device.

3. The method of claim 1, further including, subsequent to detecting the performance of the third gesture pattern, indicating disabling of the first and second predetermined function to the user on the GUI.

4. A system for switching functionality of a graphical user interface (GUI) pointer input device, comprising:
a pointer input device comprising a computer mouse;
a display providing a graphical user interface (GUI); and a processor configured by a function mode module, wherein the function mode module is adapted for:

configuring a first gesture pattern of a first strategic order of clicks and movements using the pointer input device, wherein the first gesture pattern, when performed, enables a first predetermined function of the pointer input device, the first predetermined function having been previously recorded as a series of steps normally taken by a user in conjunction with a keyboard device and thereby substituting for a default function of the pointer input device, detecting performance of the first gesture pattern and indicating enabling of the first predetermined function to the user on the GUI, wherein indicating enabling of the first predetermined function to the user on the GUI includes enabling a first enablement indication comprising a flashing cursor and enabling a flashing color associated with the cursor, subsequent to detecting the performance of the first gesture pattern and indicating the enablement of the first predetermined function using the first enablement indication, detecting performance of a second gesture pattern of a second strategic order of clicks and movements using the pointer input device, the second gesture pattern configured at a time commensurate with the configuration of the first gesture pattern; wherein the second gesture pattern, when performed, enables a second predetermined function coexistent with the first predetermined function such that the second predetermined function is enabled on top of the first predetermined function; and wherein the second predetermined function is indicated as enabled to the user on the GUI using a second enablement indication, prior to detecting the performance of the first gesture pattern, configuring a third gesture pattern, wherein the third gesture pattern, when performed, cancels the first and second predetermined function of the pointer input device and enables the default function of the pointer input device, and detecting performance of the third gesture pattern and enabling the default function.

5. The system of claim 4, wherein the function mode module is further adapted for registering depressing a button on the pointer input device for a predetermined time to enable the first predetermined function of the pointer input device.

6. The system of claim 4, wherein the function mode module is further adapted for, subsequent to detecting the performance of the third gesture pattern, indicating disabling of the first and second predetermined function to the user on the GUI.

7. A computer program product for switching functionality of a graphical user interface (GUI) pointer input device, the computer program product comprising a non-transitory computer-readable storage medium having computer-readable program code portions stored therein, the computer-readable program code portions comprising:

a first executable portion for configuring gesture patterns at a commensurate time, the gesture patterns including a first gesture pattern of a first strategic order of clicks and movements using the pointer input device comprising a computer mouse, a second gesture pattern of a second strategic order of clicks and movements using the pointer input device, and a third gesture pattern; wherein the first gesture pattern, when performed, enables a first predetermined function of the pointer input device, the first predetermined function having been previously recorded as a series of steps normally taken by a user in conjunction with a keyboard device and thereby substituting for a default function of the pointer input device;

a second executable portion for detecting performance of the first gesture pattern and indicating enabling of the first predetermined function to the user on the GUI, wherein indicating enabling of the first predetermined function to the user on the GUI includes enabling a first enablement indication comprising a flashing cursor and enabling a flashing color associated with the cursor;

a third executable portion for, subsequent to detecting the performance of the first gesture pattern and indicating the enablement of the first predetermined function using the first enablement indication, detecting performance of the second gesture pattern; wherein the second gesture pattern, when performed, enables a second predetermined function coexistent with the first predetermined function such that the second predetermined function is enabled on top of the first predetermined function; and wherein the second predetermined function is indicated as enabled to the user on the GUI using a second enablement indication; and a fourth executable portion for detecting performance of the third gesture pattern, wherein the third gesture pattern, when performed, cancels the first and second predetermined function of the pointer input device and enables the default function of the pointer input device.

8. The computer program product of claim 7, wherein the first executable portion for configuring the first gesture pattern includes a fifth executable portion for registering depressing a button on the pointer input device for a predetermined time to enable the first predetermined function of the pointer input device.

9. The computer program product of claim 7, further including a fifth executable portion for, subsequent to detecting the performance of the third gesture pattern, indicating disabling of the first and second predetermined function to the user on the GUI.

* * * * *